United States Patent Office 2,963,484
Patented Dec. 6, 1960

2,963,484

PYRIDINE FROM TETRAHYDROFURFURYL ALCOHOL

William I. Denton, Cheshire, Conn., assignor to Olin Mathieson Chemical Corporation, a corporation of Virginia No Drawing. Filed Aug. 9, 1957, Ser. No. 677,233

6 Claims. (Cl. 260—290)

This invention relates to the preparation of pyridine and, more particularly, to a novel catalytic process for the production of pyridine.

Pyridine is an industrially important chemical primarily useful as an intermediate in the preparation of other chemical compounds having important applications in the pharmaceutical and chemical industries. Pyridine itself is useful as a solvent for organic materials such as fats and mineral oils and as a catalyst in certain specific organic reactions such as the hydration of olefins and the sulfonation of alcohols.

Pyridine is currently produced from coal tar which is a by-product of coking operations. Since the supply of coal tar is dependent upon the amount of coke prepared it is obvious that the amount of pyridine which can be obtained from this source is limited. Furthermore, the pyridine which is obtained as a by-product in the destructive distillation of coal tar is contaminated by various homologues which are formed at the same time. Hence, a separation problem is presented which entails considerable expense and inconvenience. Several synthetic methods for the preparation of pyridine have been reported. These generally involve either the reaction of acetaldehyde, methanol and ammonia or the reaction of oxygen-heterocyclic compounds with ammonia. In general, these methods have been unsatisfactory because of the presence of other nitrogen-heterocyclic compounds in the reaction mixture. Among such processes, tetrahydrofurfuryl alcohol has been reacted with ammonia in the presence of various catalytic agents. The most effective of the catalysts which have been employed in this reaction have been molybdena-alumina and chromia-alumina catalysts. Of these the molybdena-alumina returned the highest yield of pyridine but its use was accompanied by the formation of excessive amounts of coke. Hence, the period for effective use of this catalyst was limited and frequent regeneration of the catalyst was necessary. The possibility of demands for increased quantities of pyridine have fostered attempts to improve upon those processes already known and to devise new methods for the preparation of pyridine.

It is an object of this invention to provide an improved process for the preparation of pyridine.

It is another object of this invention to provide an improved catalytic process for the preparation of pyridine.

It is a further object of this invention to provide a more effective process for the preparation of pyridine by employing a molybdenum containing catalyst.

Other objects will in part be obvious and will in part appear hereinafter.

It has been found that the above and other objects can be achieved by reacting tetrahydrofurfuryl alcohol and ammonia in the presence of a catalyst comprising a complex of cobalt oxide and molybdena on a suitable support. The use of the above described complex catalyst results in a marked reduction of the quantity of coke which deposits on the catalyst during the course of the reaction. By decreasing the amount of coke which is formed, poisoning of the catalyst is considerably delayed thereby permitting the catalyst to be employed for greater periods of time before regeneration is necessary. A further advantage following from the decrease in coking is the improvement in ultimate yield resulting from the fact that less of the expensive tetrahydrofurfuryl alcohol is converted to coke.

The concentration of the active catalytic material on the support may vary from about 1% to about 25%. However, for optimum results it is preferred that from about 10% to about 20% be employed. The ratio of cobalt oxide and molybdenum oxide in the active material can be widely varied, proportions of from 1 to 5 to 3 to 1, respectively, having been found satisfactory.

The catalyst as actually employed comprises the active material on a suitable support. Examples of the supports which are employed as substrate in the catalysts used in the process of the present invention are basic or neutral supports such as zinc spinels, basic aluminum phosphates, magnesia, bauxite, and magnesia-silica. Preferably, however, alumina will be used as the support and the use of activated alumina, in particular, is preferred.

In the preferred embodiment of the invention tetrahydrofurfuryl alcohol and ammonia in a molar ratio of from 1:3 to 1:7 are reacted at a temperature of from about 475° C. to about 550° C. at atmospheric pressure in the presence of a catalyst comprising 10% cobalt molybadate on activated alumina, while introducing tetrahydrofurfuryl alcohol to the reaction zone at the rate of about 0.3 to 2.0 volumes per hour per unit volume of catalyst.

While the above conditions represent those which will be employed for achievement of optimum results, other proportions and operating conditions can be employed without departing from the spirit and scope of the invention as disclosed and claimed herein. Thus, the temperature can be varied from about 400° C. to about 600° C., although the preferred temperature of reaction is from about 450° C. to about 550° C. The particular temperature employed will, of course, depend to some degree upon the other conditions of reaction. For example, higher temperatures will be employed at short residence times whereas lower temperatures should be employed at longer residence times.

The reaction can be carried out under atmospheric, super-atmospheric and sub-atmospheric pressures. Pressures ranging from about 0.1 to about 20 atmospheres can be employed, although the preferred range of pressure is from about 0.5 to about 10 atmospheres.

The mol ratio of ammonia to tetrahydrofurfuryl alcohol can be varied over a range of from about 2 moles of ammonia to 1 mol of tetrahydrofurfuryl alcohol to about 10 moles of ammonia to 1 mol of tetrahydrofurfuryl alcohol. However, the preferred mol ratios of ammonia to tetrahydrofurfuryl alcohol are in the range of from about 3 to 1 to 7 to 1. At lower molar ratios the process operates satisfactorily but large amounts of the more expensive tetrahydrofurfuryl alcohol have to be processed, while at higher molar ratios the cost of handling and recovering additional ammonia becomes prohibitive.

Space velocity as used herein is liquid hourly space velocity. It is defined as the volume of tetrahydrofurfuryl alcohol which is supplied to the reaction zone per hour per unit volume of catalyst employed. The space velocity can be varied from about 0.1 to about 10, and is preferably maintained at from 0.3 to 2.0. It should be noted that the space velocity is based upon the principal reactant and is, therefore, not necessarily related to residence time since variations in the mol ratios of reactant or in the pressure can change the residence time without affecting the space velocity.

In order to provide a fuller understanding of the present invention reference is made to the following specific examples. It is to be understood however, that these examples do not in any way limit the scope of the invention.

*Example I*

500 grams of 4–8 mesh activated alumina were evacuated for one hour in a filter flask equipped with dropping funnel. 145 grams of $Co(NO_3)_2 \cdot 6H_2O$ were dissolved in 185 cc. of distilled water and placed in the dropping funnel on the filter flask, while maintaining the alumina under vacuum. This solution was added to the alumina in portions with shaking after each addition to mix the solution and alumina and ensure more even distribution of the solution on the alumina. 90 grams of ammonium para molybdate were dissolved in a solution of 40 cc. of ammonium hydroxide and 80 cc. of distilled water. This solution was then placed in the dropping funnel and added in small portions with shaking after each addition. The final mixture was allowed to stand at room temperature and pressure for 30 minutes with shaking every 10 minutes after which it was filtered and washed with 200 cc. of distilled water. The catalyst was then dried for 16 hours at 135° C. in an oven followed by muffling for 16 hours at 450° C. This catalyst was evaluated in the runs shown in the attached table which provides a comparison with a conventional molybdena-alumina catalyst:

*Comparison of cobalt molybdate and molybdena catalysts*

| Run No. | 1 | 2 | 3 | 4 | 5 | 6 |
|---|---|---|---|---|---|---|
| Catalyst (a) | A | C | A | A | C | C |
| Space Velocity (b) | 1.0 | 1.0 | 0.5 | 0.5 | 0.5 | 0.5 |
| Temperature, °C. (c) | 525 | 525 | 475 | 500 | 450 | 500 |
| Yield, Mole percent (d): | | | | | | |
| Pyridine | 39 | 45 | 27 | 41 | 33 | 51 |
| Coke on Catalyst | 1.9 | 4.2 | 1.4 | 2.2 | 5.8 | 5.5 |

(a) A—Cobalt molybdate on activated alumina prepared as in example 1. C—10 percent molybdena on activated alumina.
(b) Volume of tetrahydrofurfuryl alcohol per hour per volume of catalyst.
(c) 3 hour runs, atmospheric pressure, 5 $NH_3$:1 tetrahydrofurfuryl alcohol.
(d) Mole percent based on equivalent tetrahydrofurfuryl alcohol consumed divided by tetrahydrofurfuryl alcohol charged.

It is readily evident from the above table that the use of the cobalt molybdate catalyst has decreased the formation of coke more than 50% with only 6% decrease in yield of pyridine (Example 1 vs. Example 2). The effect of cobalt molybdate in reducing the formation of coke is further shown by comparison of Examples 3 and 4 with Examples 5 and 6. The formation of coke is again reduced more than 50% at a slight sacrifice in yield level.

The invention having been disclosed what is claimed to be new and desired to be secured by Letters Patent is:

1. The process for the preparation of pyridine in which ammonia and tetrahydrofurfuryl alcohol are reacted in the mol ratio of from 2 to 1 to 10 to 1 at a temperature of from about 450° C. to 600° C., a pressure from about 0.1 to about 20 atmospheres, space velocity from about 0.1 to about 10 in the presence of a catalyst consisting essentially of from about 1% to 25% of a complex of a molybdenum oxide and an oxide of cobalt on a support selected from the group consisting of neutral and basic oxides.

2. The process according to claim 1 in which the catalyst comprises a complex of a molybdenum oxide and cobalt oxide.

3. The process according to claim 2 in which the molybdenum oxide is molybdenum trioxide.

4. The process according to claim 3 in which the support is activated alumina.

5. A process for the preparation of pyridine which comprises reacting tetrahydrofurfuryl alcohol with ammonia in the mol ratio of from about 3:1 to about 7:1 at a temperature of from about 450° C. to about 550° C., a pressure of from about 0.5 to about 10 atmospheres, and a space velocity of from about 0.3 to about 2.0, in the presence of a catalyst consisting essentially of from about 10% to about 20% of a complex of cobalt oxide and a molybdenum oxide on a support selected from the group consisting of neutral and basic oxides.

6. A process for the preparation of pyridine which comprises reacting 5 moles of ammonia with 1 mol of tetrahydrofurfuryl alcohol at a temperature of 525° C., at atmospheric pressure, and a space velocity of 1.0, in the presence of a catalyst comprising cobalt molybdate on activated alumina.

References Cited in the file of this patent

UNITED STATES PATENTS

| 2,543,424 | Spillane et al. | Feb. 27, 1951 |
| 2,650,236 | Condon et al. | Aug. 25, 1953 |

FOREIGN PATENTS

| 695,472 | Germany | Aug. 26, 1940 |
| 382,819 | Italy | Mar. 21, 1940 |